US008317380B2

(12) United States Patent
Cho et al.

(10) Patent No.: US 8,317,380 B2
(45) Date of Patent: Nov. 27, 2012

(54) HEAT-DISSIPATING APPARATUS FOR VEHICLE LAMP

(75) Inventors: Jin-Hwan Cho, Gyeongbuk (KR); Hak-Bong Kim, Gyeongbuk (KR)

(73) Assignee: SL Lighting, Daegu (KR)

( * ) Notice: Subject to any disclaimer, the term of this patent is extended or adjusted under 35 U.S.C. 154(b) by 580 days.

(21) Appl. No.: 12/338,868

(22) Filed: Dec. 18, 2008

(65) Prior Publication Data

US 2009/0154189 A1 Jun. 18, 2009

(30) Foreign Application Priority Data

Dec. 18, 2007 (KR) ........................ 10-2007-0133476

(51) Int. Cl.
*B60Q 1/00* (2006.01)
*F21V 21/00* (2006.01)

(52) U.S. Cl. ........................................ 362/547; 362/545

(58) Field of Classification Search .................. 362/547, 362/545

See application file for complete search history.

(56) References Cited

U.S. PATENT DOCUMENTS

| | | | | |
|---|---|---|---|---|
| 5,642,935 | A * | 7/1997 | Schmitt | 362/528 |
| 6,004,010 | A * | 12/1999 | Inage et al. | 362/294 |
| 6,497,507 | B1 * | 12/2002 | Weber | 362/547 |
| 7,572,309 | B2 * | 8/2009 | Scagliarini | 55/385.4 |
| 8,147,109 | B2 * | 4/2012 | Wan et al. | 362/547 |
| 2007/0091632 | A1 * | 4/2007 | Glovatsky et al. | 362/547 |
| 2007/0127257 | A1 * | 6/2007 | Erion et al. | 362/547 |
| 2009/0262550 | A1 * | 10/2009 | Inoue | 362/547 |
| 2009/0268475 | A1 * | 10/2009 | Ball et al. | 362/373 |
| 2009/0303742 | A1 * | 12/2009 | Yasuda | 362/547 |

FOREIGN PATENT DOCUMENTS

| | | |
|---|---|---|
| JP | 2006-332052 | 12/2006 |
| KR | 10-0778106 | 11/2007 |

* cited by examiner

*Primary Examiner* — David J Makiya
(74) *Attorney, Agent, or Firm* — Edwards Wildman Palmer LLP

(57) ABSTRACT

A heat-dissipating apparatus for a vehicle lamp includes: a light source unit comprising at least one LED; a housing which houses the light source unit therein and is formed with an opening in a rear portion thereof; a dust cover coupled to the housing at or near the position of the opening; and a cooling fan coupled to the dust cover for dissipating heat generated by the light source unit.

4 Claims, 6 Drawing Sheets

HEAT-DISSIPATING APPARATUS FOR VEHICLE LAMP

CROSS-REFERENCE TO RELATED APPLICATION

This application claims priority from Korean Patent Application No. 10-2007-0133476 filed on Dec. 18, 2007, the disclosure of which is incorporated herein by reference in its entirety.

BACKGROUND

1. Technical Field

The present invention relates to a heat-dissipating apparatus for a vehicle lamp apparatus, which can cool the lamp apparatus more efficiently and easily couple or decouple the cooling fan to/from the light emitting diode (LED) housing of the vehicle lamp apparatus.

2. Related Art

A vehicle is equipped with vehicle lamps. Vehicle lamps have lighting function and signaling function, among others. That is, vehicle lamps enable the driver of the vehicle to easily detect objects around and ahead of the vehicle while driving at night or in a dark area. They also inform other vehicles and road users of the vehicle's driving state. For example, a headlamp and a fog lamp are designed for the lighting function, and a direction indicator, a taillight, a brake light, and a side marker are designed for the signaling function. Typically, halogen lamps and high intensity discharge (HID) lamps are used as a light source.

Recently, LEDs were adopted as a light source for vehicle headlamps or lighting devices. The color temperature of LEDs is approximately 5500 kelvin (K) which is close to sunlight. Thus, LEDs cause less eyestrain than other light sources. Since LEDs are small-sized, lamps using LEDs can be designed with a greater degree of freedom. In addition, LEDs are economical since they are semi-permanent. In this regard, LEDs are being introduced to reduce complexity in the configuration of lamps and prevent an increase in the number of processes required to manufacture the lamps. That is, attempts are being made to extend the life of lamps and reduce the space occupied by lamp apparatuses by taking advantage of properties of LEDs.

However, temperature remains a major challenge in the adoption of LEDs as a light source for vehicle lamps. As the performance of LEDs improves, the LEDs emit heat at higher temperatures, and the heat at higher temperatures reduces the performance of the LEDs. That is, as the temperature of LEDs increases, the luminous efficiency thereof significantly deteriorates. To address this problem, the junction temperature of LEDs must be increased, or a heat-dissipating apparatus for lowering the ambient temperature must be installed. In particular, since there is a limit to increasing the junction temperature, the heat-dissipating apparatus must be used efficiently. Although the junction temperature of LEDs is expected to increase continuously, an improved heat-dissipating apparatus is essential to increase the efficiency of a lamp more effectively.

FIG. 1 is a schematic perspective view of a conventional LED heat-dissipating apparatus 10. Referring to FIG. 1, the conventional LED heat-dissipating apparatus 10 includes an LED 11, an LED-mounting block 12, a heat sink 13, a cooling fan 14, a dust cover 15, and a housing 16.

In the conventional LED heat-dissipating apparatus 10, the heat sink 13 is installed under the LED-mounting block 12 having the LED 11 mounted thereon and thus dissipates heat emitted from the LED 11. However, it is not easy to efficiently dissipate all heat from the LED 11 by using the heat sink 13 alone.

For this reason, the cooling fan 14 is used. The cooling fan 14 is installed near the LED 11 and brings air in from outside to cool the LED 11. However, it is difficult to separately couple or decouple the dust cover 15 and the cooling fan 14 to/from the housing 16. In addition, it requires additional costs and a large space to separately couple the dust cover 15 and the cooling fan 14 to the housing 16.

Therefore, there is a need for a heat-dissipating apparatus which can efficiently dissipate heat emitted from the LED 11 and can be easily assembled or dismantled.

The above information disclosed in this Background section is only for enhancement of understanding of the background of the invention and therefore it may contain information that does not form the prior art that is already known in this country to a person of ordinary skill in the art.

SUMMARY

According to an aspect of the present invention, there is provided a heat-dissipating apparatus for a vehicle lamp including: a light source unit comprising at least one LED; a housing which houses the light source unit therein and is formed with an opening in a rear portion thereof; a dust cover coupled to the housing at or near the position of the opening; and a cooling fan coupled to the dust cover for dissipating heat generated by the light source unit.

According to another aspect of the present invention, there is provided a vehicle lamp apparatus including: a housing formed with an opening in a rear portion thereof; a transparent cover attached to a front portion of the housing; at least one light source unit positioned in the housing, wherein the light source unit each comprises at least one LED; at least one reflector reflecting light emitted from the light source unit or units toward the front portion of the housing; a support fixing the light source unit or units to the housing and supporting the light source unit or units; a dust cover coupled to the housing at or near the position of the opening; and a cooling fan coupled to the dust cover for dissipating heat generated by the light source unit.

However, aspects of the present invention are not restricted to the one set forth herein. The above and other aspects and features of the present invention will become more apparent to one of ordinary skill in the art to which the present invention pertains by referencing the detailed description of the present invention given below.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Figure 1:
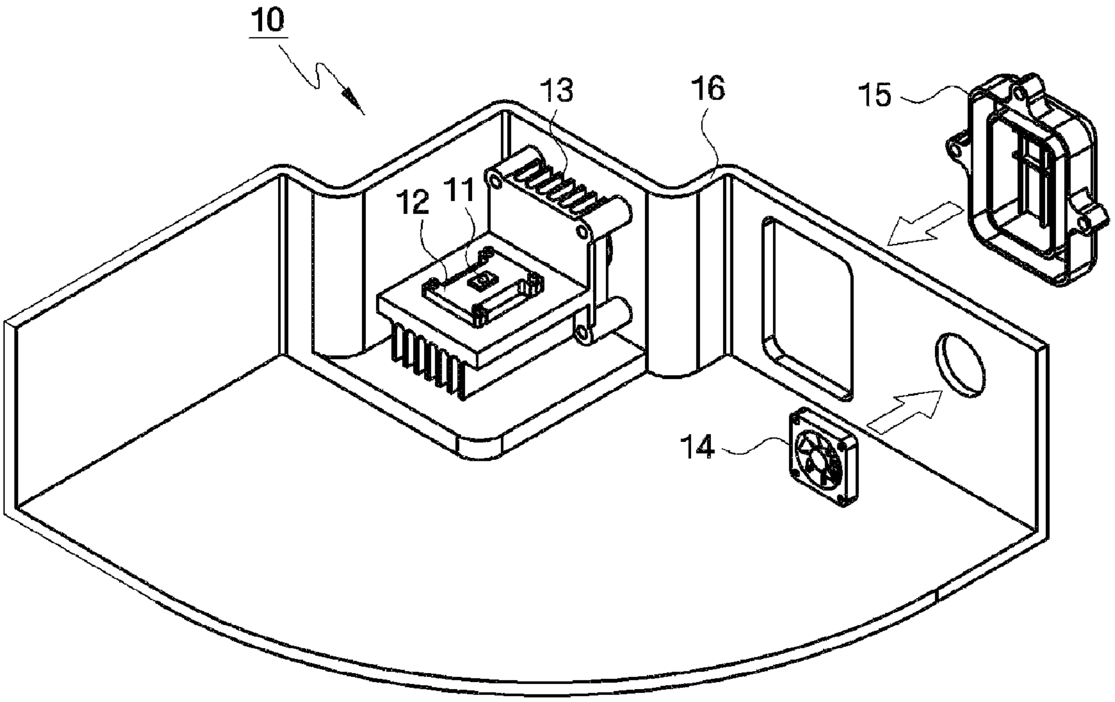
FIG. 1 (PRIOR ART)
FIG. 1 is a schematic perspective view of a conventional LED heat-dissipating apparatus.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

In some embodiments, well-known processing processes, well-known structures and well-known technologies will not be specifically described in order to avoid ambiguous interpretation of the present invention.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising,” when used in this specification, specify the presence of stated components, steps, operations, and/or elements, but do not preclude the presence or addition of one or more other components, steps, operations, elements, and/or groups thereof. As used herein, the term “and/or” includes any and all combinations of one or more of the associated listed items.

It is understood that the term “vehicle” or “vehicular” or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Embodiments of the invention are described herein with reference to cross-section illustrations that are schematic illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. In addition, each component shown in figures of the present invention may have been enlarged or reduced for ease of description. Like reference numerals in the drawings denote like elements, and thus their description will be omitted.

Hereinafter, an LED heat-dissipating apparatus according to exemplary embodiments of the present invention will be described in detail with reference to the attached drawings.

Figure 2:
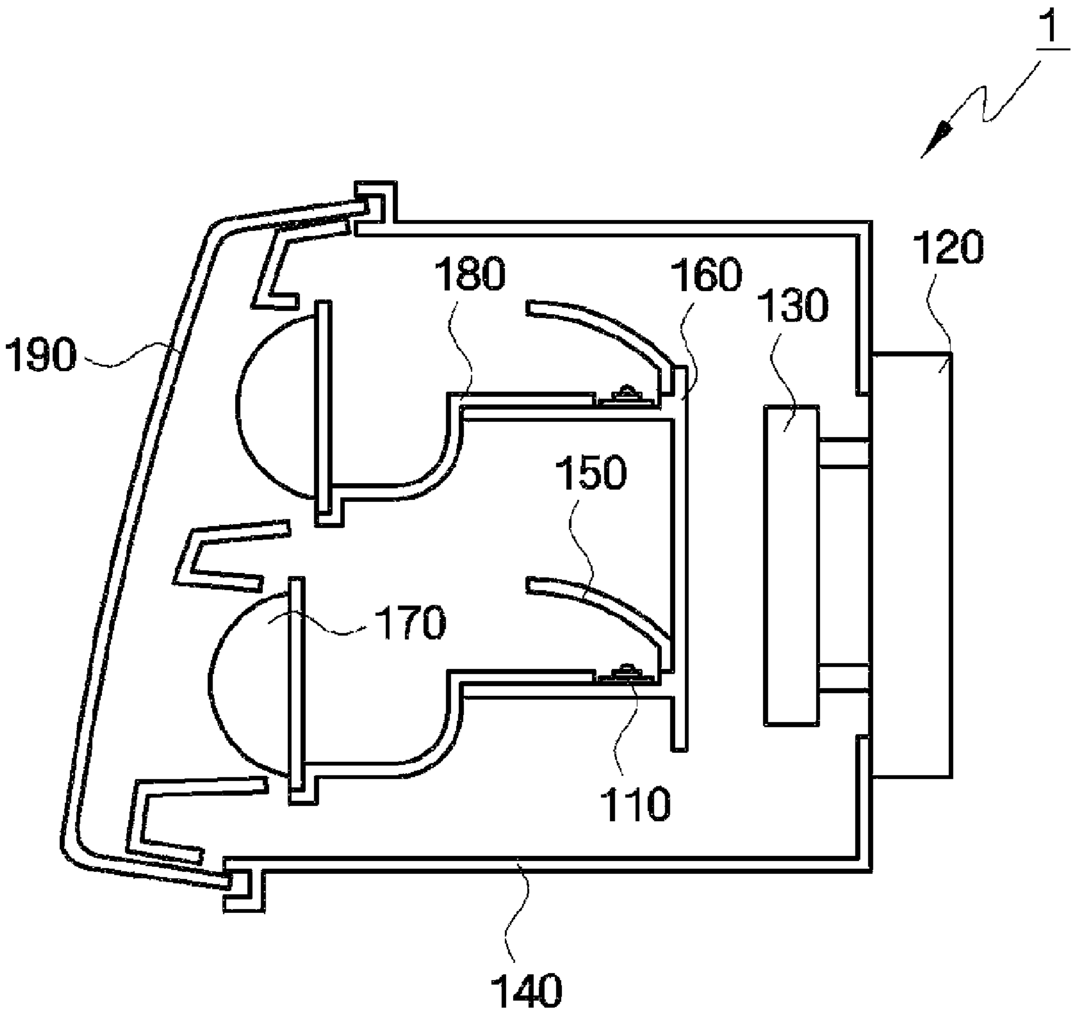
FIG. 2 schematically shows a longitudinal section of a vehicle lamp apparatus according to an exemplary embodiment of the present invention.
Figure 3:
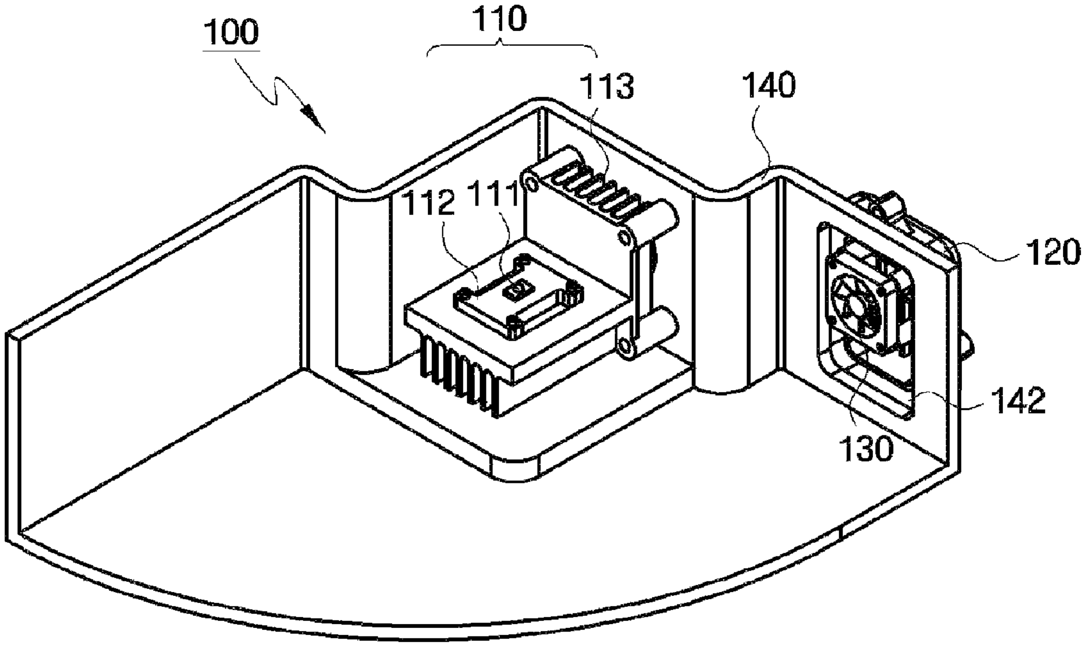
FIG. 3 is a schematic perspective view of a heat-dissipating apparatus for a vehicle lamp according to an exemplary embodiment of the present invention.

Referring to FIGS. 2 and 3, a vehicle lamp apparatus 1 according to an embodiment may include a housing 140, a transparent cover 190, one or more LED light source units 110, one or more reflectors 150, a support 160, a dust cover 120, and a cooling fan 130. The vehicle lamp apparatus 1 may be applied to, for example, a vehicle headlamp, a vehicle rear lamp, and a vehicle fog lamp.

The transparent cover 190 is attached to the front of the housing 140, and light emitted from the LED light source units 110 passes through the transparent cover 190.

Each of the LED light source units 110 may include at least one LED and generate and emit light. The housing 140 may include the support 160. The support 160 fixes the LED light source units 110 to the housing 140 and thus supports the LED light source units 110.

The reflectors 150 may reflect light generated by the LEDs toward the front of the housing 140. The reflectors 150 may be classified as parabolic reflectors (concave reflectors), linear reflectors, or optic reflectors (convex reflectors) according to their shape. Each of the reflectors 150 may be configured so as to include a plurality of cells each having different curvatures, which can control light diffusion in a desired manner.

A vehicle lamp, which emits light generated by one or more LED light source units toward the front of a housing by using one or more reflectors as described above, is referred to as a reflection-type lamp.

The vehicle lamp apparatus 1 according to the present embodiment may further include one or more projection lenses 170 which diffuse light reflected by the reflectors 150 toward the front of a vehicle. The number of the projection lens 170 may vary corresponding to that of the LED light source unit 110.

The projection lenses 170 are aspheric lenses. Since all light, which is generated by the LED light source units 110, passes through respective focuses of the projection lenses 170, it may be emitted in a straight line. Alternatively, light generated by the LED light source units 110 may be reflected by the reflectors 150 and then passed through the respective focuses of the projection lenses 170, respectively. Thus, the light may be emitted in a straight line. When all light is emitted through the projection lenses 170 toward the front of the vehicle, it may dazzle drivers of oncoming vehicles. Therefore, shields 180 may be installed near the focuses of the projection lenses 170, respectively, to prevent light from being emitted through a portion of each of the projection lenses 170 above a horizontal line that passes through the center of each of the projection lenses 170.

A vehicle lamp, which uses one or more projection lenses as described above, is referred to as a projection-type lamp.

As described above, the vehicle lamp apparatus 1 may use a reflection-type lamp, a projection-type lamp, or a combination of the same according to the way in which light generated by the LED light source units 110 is emitted toward the front of the vehicle.

The dust cover 120 may prevent foreign objects contained in air, which flows in from the outside, from entering the housing 140. The cooling fan 130 may dissipate heat, which is generated by the LED light source units 110, out of the housing 140 by using the air that flows in from the outside.

Figure 4:
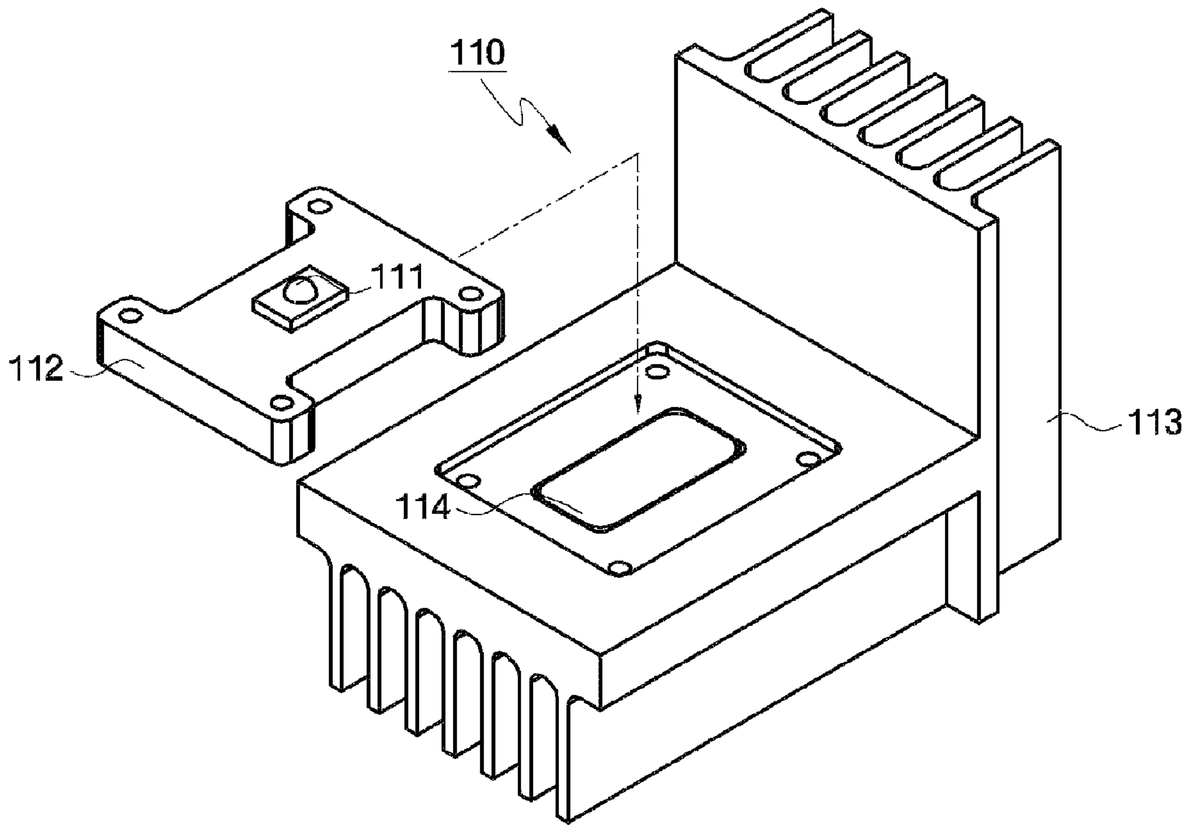
FIG. 4 is a schematic perspective view of an LED light source unit included in the heat-dissipating apparatus of FIG. 3.

Referring to FIGS. 3 and 4, the LED heat-dissipating apparatus 100 may include an LED light source unit 110, a dust cover 120, and a cooling fan 130 and the LED light source unit 110 may include an LED 111 and emit light generated by the LED 111. The LED 111 is a lighting device which can reduce power consumption, extend the life of a lamp, and reduce the size of a lamp apparatus. The LED light source unit 110 may include an LED-mounting block 112 to install the LED 111 in the housing 140.

The LED heat-dissipating apparatus 100 may further include a heat sink 113. The heat sink 113 may be connected to the LED light source unit 110 for dissipating heat generated from the LED light source unit 110 out of the housing 140. That is, the heat sink 113 may receive heat from the LED light source unit 110 and uniformly disperse the heat all over the heat sink 113, so that the heat can be released into the air through the cooling fan 130. Accordingly, the heat sink 113 is required to have a large surface area. When the LED heat-dissipating apparatus 100 includes the cooling fan 130, the heat sink 113 may be structured to allow wind from the cooling fan 130 to easily flow out of the heat sink 113. To this end, the heat sink 113 may include a plurality of fins which are shaped like wings and separated from each other.

Preferably, the heat sink 113 may be made of aluminum. Aluminum is malleable and has superior thermal conductivity. The material of the heat sink 113, however, is not limited to aluminum and may be changed by those of ordinary skill in the art to which the present invention pertains.

A thermally conductive material 114, which transfers heat generated by the LED light source unit 110 to the heat sink 113, may be interposed between the LED light source unit 110 and the heat sink 113. Suitably, the thermally conductive material 114 may be, but not limited to, silicon. The thermally conductive material 114 may absorb and dissipate heat, thereby preventing heat generated by the LED light source unit 110 from causing malfunctions and errors and improving shock-absorbing and dustproof effects.

The dust cover 120 may be coupled to the housing 140. The dust cover 120 may prevent foreign objects contained in air, which flows in from the outside, from entering the housing 140.

In an embodiment, the dust cover 120 may be installed in the rear of the housing 140. That is, the dust cover 120 may be coupled to a portion of the housing 140 behind the LED light source unit 110 to prevent dust and impurities contained in air, which flows in from the outside, from entering the housing 140. A through-hole 142 may be formed in the portion of the housing 140 to which the dust cover 120 is coupled, and the LED light source unit 110 may be inserted into the through-hole 142. The dust cover 120 may be shaped like, but is not limited to, a rectangular parallelepiped.

The dust cover 120 may be coupled to the housing 140 by a coupling member (not shown), such as a bolt. Alternatively, the dust cover 120 may be coupled to the housing 140 by, e.g., a screw or hinge. To screw the dust cover 120 to the housing 140, internal and external screws may be formed in a region where the dust cover 120 is coupled to the housing 140, and the dust cover 120 may be coupled to the housing 140 by the internal and external screws. To hinge the dust cover 120 to the housing 140, a hinge may be formed on a surface of the dust cover 120, and the dust cover 120 may be rotated about the hinge and coupled to the housing 140 by the hinge. When the dust cover 120 is to be screwed to the housing 140, it may be cylindrical. In order to further tightly couple the dust cover 120 to the housing 140, a sealing member, such as a rubber ring, may be inserted into the region where the dust cover 120 is coupled to the housing 140. The method of coupling the dust cover 120 to the housing 140 is not limited to the above examples and may be changed by those of ordinary skill in the art.

The cooling fan 130 may dissipate heat, which is generated by the LED light source units 110, out of the housing 140 by using air that flows in from the outside. That is, the cooling fan 130 forcibly circulates air within the housing 140, thereby cooling the housing 140. When the cooling fan 130 is used together with the heat sink 113, all heat emitted from the LED light source unit 110 can be dissipated more efficiently than when only the heat sink 113 is used.

Suitably, the cooling fan 130 may be coupled to the dust cover 120. That is, the cooling fan 130 is coupled to, e.g., the front or rear of the dust cover 120, and then the cooling fan 130 coupled to the dust cover 120 is coupled, as a single unit, to the hosing 140.

Figure 5:
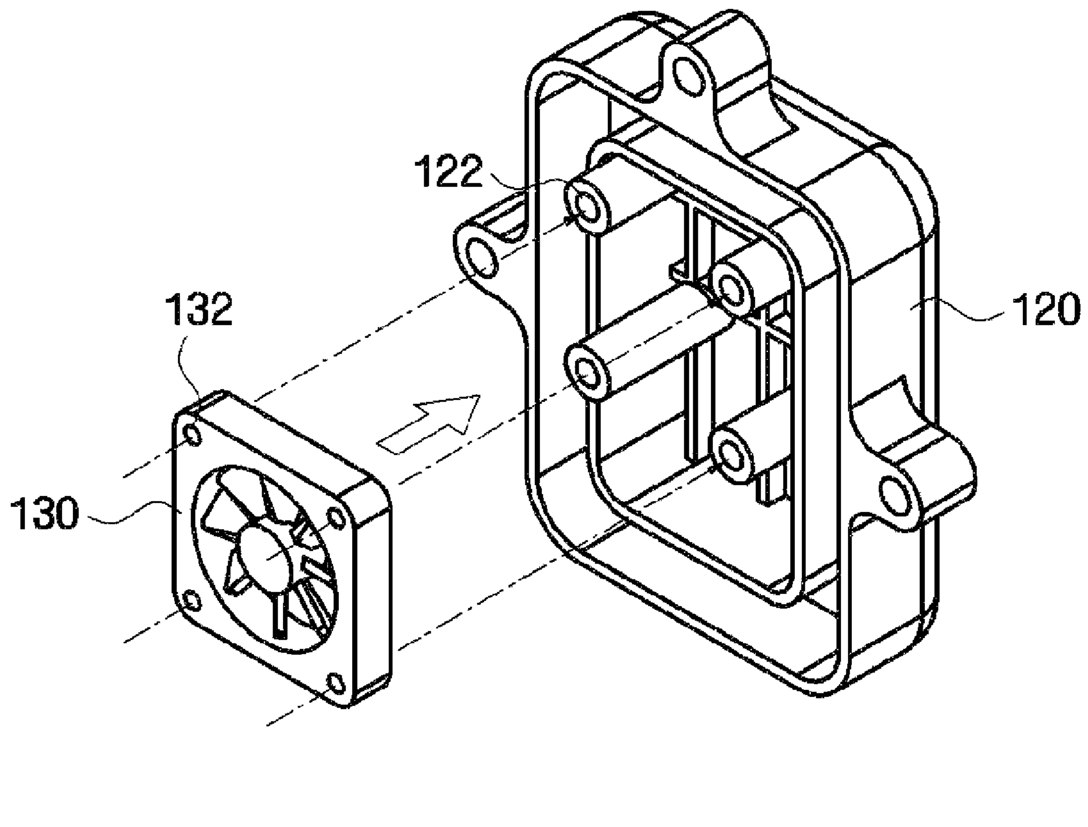
FIG. 5 is a perspective view for explaining a method of coupling a cooling fan to a dust cover in the heat-dissipating apparatus of FIG. 3.

Referring to FIG. 5, a method of coupling the cooling fan 130 to the dust cover 120 in the heat-dissipating apparatus of FIG. 3 will be described.

In particular, the cooling fan 130 may be coupled to the dust cover 120 before the dust cover 120 is coupled to the housing 140. Here, a plurality of coupling holes 132, such as drill holes, counterbores or countersinks, may be formed in the cooling fan 130 to couple the cooling fan 130 to the dust cover 120. In addition, a plurality of coupling holes 122, such as screw taps, may be formed in the dust cover 120. Conversely, the coupling holes 132 formed in the cooling fan 130 may be screw taps, and the coupling holes 122 formed in the dust cover 120 may be drill holes, counterbores, or countersinks. The method of coupling the cooling fan 130 to the dust cover 120 is not limited to the above example, i.e., screwing the cooling fan 130 to the dust cover 120, and may be changed by those of ordinary skill in the art.

Figure 6:
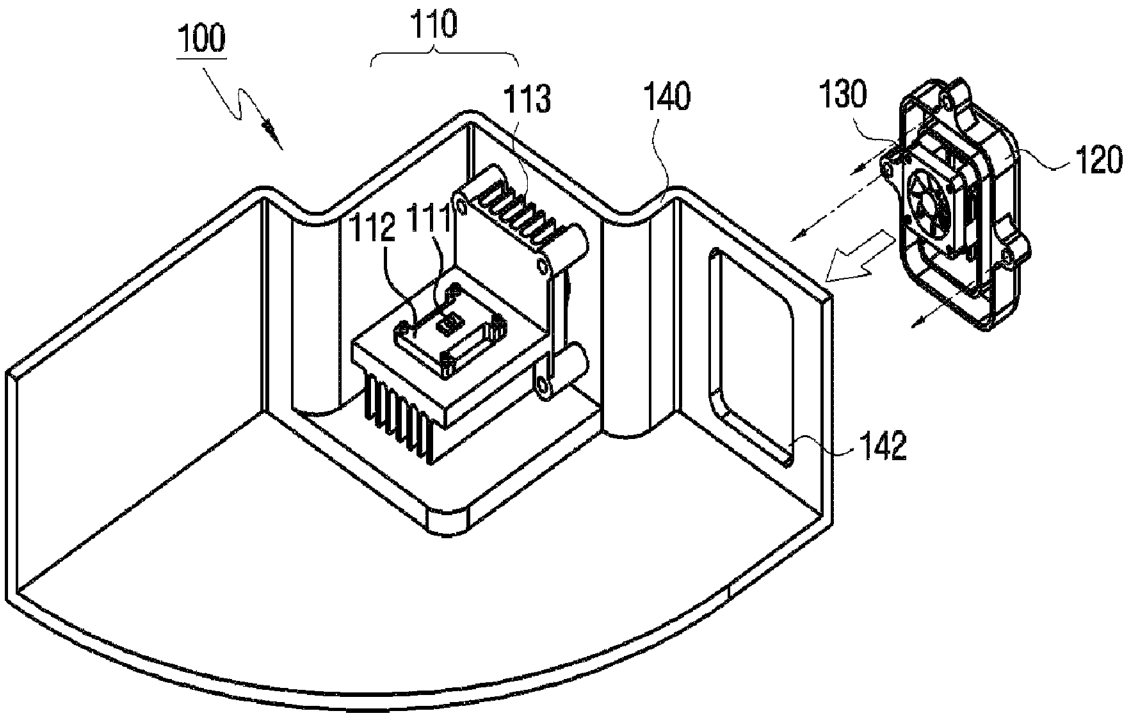
FIG. 6 is an exploded perspective view for explaining a method of coupling the cooling fan and the dust cover to a housing of heat-dissipating apparatus of FIG. 3.

A method of assembling the LED heat-dissipating apparatus 100 as described above will now be described with reference to FIGS. 5 and 6.

Referring to FIG. 5, the cooling fan 130 may be placed on the dust cover 120 and then coupled to the dust cover 120 by coupling members such as screws or bolts. Then, as shown in FIG. 6, the dust cover 120 having the cooling fan 130 coupled thereto may be coupled to the rear of the housing 140. Thus, there is no need to separately coupe or decouple the cooling fan 130 and the dust cover 120 to/from the housing 140. That is, the cooling fan 130 and the dust cover 120 can be easily coupled or decoupled, as a single unit, to/from the housing 140. It is apparent to those of ordinary skill in the art that the cooling fan 130 and the dust cover 120 can be coupled to the housing 140 by using various methods other than the above method.

In a conventional LED heat-dissipating apparatus, a cooling fan is disposed adjacent to an LED light source in a housing and installed separately from a dust cover. Thus, it is difficult and requires additional costs to install the cooling fan in the housing. However, in the LED heat-dissipating apparatus 100 according to the present invention, the cooling fan 130 is coupled to the dust cover 120, and then the dust cover 120 having the cooling fan 130 coupled thereto is coupled to the housing 140. Thus, the cooling fan 130 can be easily installed in the housing 140, and the space which otherwise may be occupied by the cooling fan 130 can be used for other purposes. In addition, the cost required to maintain or replace the cooling fan 130 can be reduced. Also, the cooling fan 130 can efficiently dissipate heat emitted from the LED 111 out of the housing 140, thereby extending the life of the LED 111. It should be noted that the effects of the present invention are not restricted to the above. The above and other effects of the present invention will become more apparent to one of daily skill in the art to which the present invention pertains by referencing the claims.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation. Therefore, the scope of the invention is defined not by the detailed description of the invention but by the appended claims, and the meaning of the scope of the claims, the scope of the claims, and any changes will be construed as being within the scope of the present invention.

What is claimed is:

1. A heat-dissipating apparatus for a vehicle lamp comprising:

a light source unit comprising at least one LED;

a housing which houses the light source unit therein and is formed with an opening in a rear of the housing, the opening being sized large enough to receive the light source unit;

a dust cover having a front surface and a rear surface and coupled to the housing at or near the position of the opening; and a cooling fan coupled to the front surface of the dust cover as a single unit and coupled to the rear of the housing.

2. The apparatus of claim 1, further comprising a heat sink coupled to the light source unit for dissipating the heat generated by the light source unit.

3. The apparatus of claim 2, wherein the heat sink comprises a plurality of fins.

4. A vehicle lamp apparatus comprising:

a housing formed with an opening in a rear of the housing;

a transparent cover attached to a front of the housing;

at least one light source unit positioned in the housing, wherein the light source unit each comprises at least one LED, the opening being sized large enough to receive the light source unit;

at least one reflector reflecting light emitted from the light source unit or units toward the front of the housing;

a support fixing the light source unit or units to the housing and supporting the light source unit or units;

a dust cover having a front surface and a rear surface and coupled to the housing at or near the position of the opening; and a cooling fan coupled to the front surface of the dust cover as a single unit and coupled to the rear of the housing.

* * * * *